United States Patent [19]

Burns

[11] Patent Number: 5,370,045

[45] Date of Patent: Dec. 6, 1994

[54] DRIVE DISK ADAPTER ASSEMBLY FOR A MECHANICAL PUNCH PRESS

[75] Inventor: Bradley A. Burns, Wapakoneta, Ohio

[73] Assignee: The Minster Machine Company, Minster, Ohio

[21] Appl. No.: 125,539

[22] Filed: Sep. 22, 1993

[51] Int. Cl.$^5$ ............................................. B30B 1/06
[52] U.S. Cl. .................................. 100/282; 192/70.17
[58] Field of Search ................ 100/280, 282, 292; 192/70.17, 70.18

[56] References Cited

U.S. PATENT DOCUMENTS

| | | | |
|---|---|---|---|
| 2,229,319 | 1/1941 | Wesselhoff | 192/70.17 |
| 2,577,641 | 12/1951 | Wissman | 100/282 X |
| 2,667,248 | 1/1954 | Wissman | 100/282 X |
| 2,745,338 | 5/1956 | Wissman | 100/282 |
| 3,642,101 | 2/1972 | Hauth | 188/73.3 |
| 3,981,381 | 9/1976 | Nosek | 192/70.18 |
| 4,069,905 | 1/1978 | de Gennes | 192/112 |
| 4,478,324 | 10/1984 | Sink | 192/70.17 |
| 4,566,573 | 1/1986 | Lane, Jr. | 192/70.18 |
| 4,619,353 | 10/1986 | Maeda | 192/70.18 |
| 4,690,259 | 9/1987 | Naudin | 192/70.28 |
| 4,807,731 | 2/1989 | Collins | 192/18 A |
| 4,828,083 | 5/1989 | Naudin | 192/52 |
| 5,048,658 | 9/1991 | Reik | 192/70.17 X |
| 5,127,499 | 7/1992 | Beccaris et al. | 192/70.27 |

FOREIGN PATENT DOCUMENTS

| | | | |
|---|---|---|---|
| 851825 | 1/1940 | France | 100/282 |
| 256544 | 5/1988 | Germany | 100/280 |

Primary Examiner—Stephen F. Gerrity
Attorney, Agent, or Firm—Baker & Daniels

[57] ABSTRACT

A mechanical press including a two part drive disk assembly to permit radial expansion in the drive disk, reduces or eliminates axial movement and/or axial closeout of the drive disk caused by thermal expansion of the drive disk. The drive disk is attached to an adapter plate by a plurality of flexible straps centrally attached to the circumferential edge of the drive disk and at the ends to flanges on the adapter plate. The adapter plate is connected to the conventional clutch plate of the press. During operation, the drive disk expands due to frictional heating in a radial direction as permitted by the flexible straps. In one form of the invention, the flexible straps are stacked and constructed from stainless steel.

21 Claims, 4 Drawing Sheets

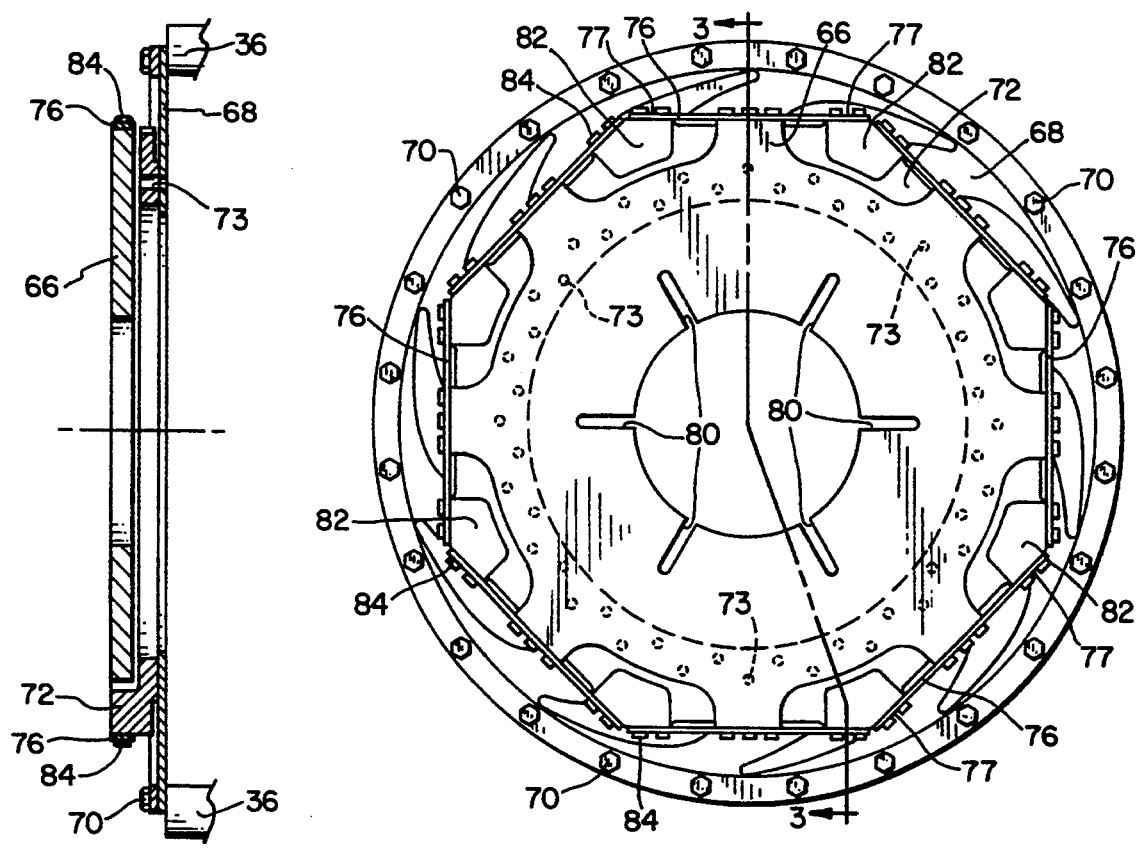
FIG. 3
FIG. 4
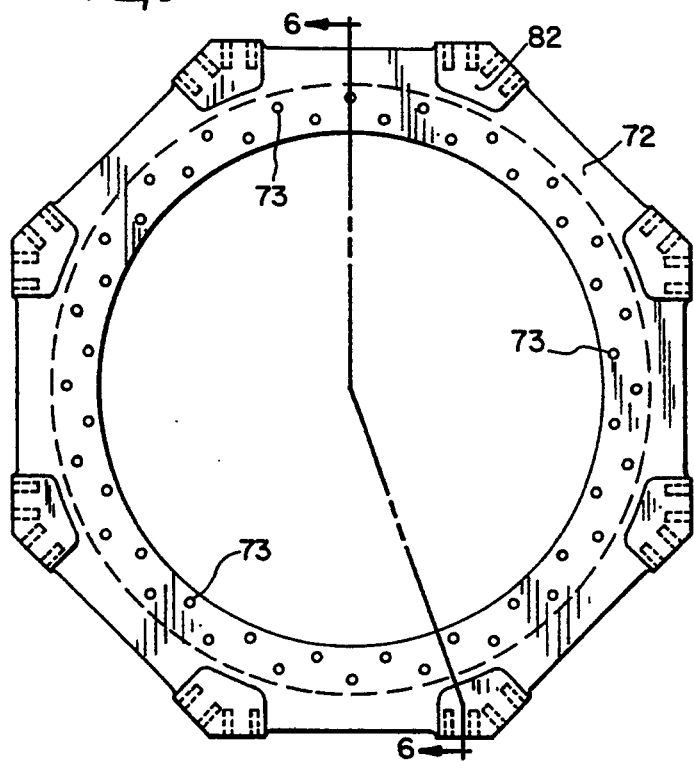
FIG. 5
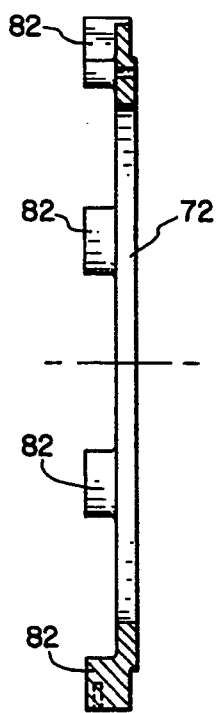
FIG. 6

DRIVE DISK ADAPTER ASSEMBLY FOR A MECHANICAL PUNCH PRESS

BACKGROUND OF THE INVENTION

The present invention relates to a mechanical press, and in particular, a drive disk adapter assembly to prevent drive disk closeout during press operation.

The typical mechanical press comprises a bed which is mounted to a platform or the floor of the shop, a vertically spaced crown portion in which the drive assembly for the slide is contained, and one or more uprights rigidly connecting the bed and crown and maintaining the bed and crown in vertically spaced relationship. The crown contains the drive assembly, which typically comprises a crankshaft having a plurality of eccentrics thereon and connecting rods connecting to the eccentrics of the crankshaft at their upper ends and to the slide at their lower ends. The slide is mounted within the uprights for vertical reciprocating motion and is adapted to have the upper half of the die set mounted to it with the other half mounted to the bolster, which is connected to the bed.

At one end of the crankshaft is usually mounted a flywheel and clutch assembly wherein the flywheel is connected by a belt to the output pulley of a motor so that when the motor is energized, the massive flywheel rotates continuously. When the clutch is energized, the rotary motion of the flywheel is transmitted to the crankshaft which causes the connecting rods to undergo rotary-oscillatory motion that is transmitted to the slide assembly by means of a wrist pin, for example, so that the rotary-oscillatory motion is converted to straight reciprocating motion. The connecting rods may be connected directly to the slide or connected by means of pistons which in turn are slidably received within cylinders connected to the crown.

Normally, a clutch plate is attached to the flywheel, the clutch plate having a drive disk attached thereto. A driven disk, comprising a combination brake/clutch assembly, is attached to the crankshaft. The brake/clutch assembly may be selectively energized to engage the drive disk of the flywheel thereby conducting rotational energy to the crankshaft or may be de-energized to brake movement of the crankshaft.

A problem, which has been experienced in the past, is a tendency for the drive disk, connected to the flywheel or clutch plate, to heat up due to frictional contact of the drive disk to the driven disk. The frictional connection of the drive disk with the driven plate causes the drive disk to thermally expand during use. This expansion causes the drive disk to move axially, one way or the other, into contact with one of the clutch facings of the driven disk or clutch sleeve. The contact formed by the axial movement of the drive disk is called axial closeout. This incidental contact causes excessive glazing and friction between the clutch facing and drive disk, thereby causing burnout of the clutch facing and/or excessive wear. Further, axial closeout prevents the drive disk from fully disengaging from the driven disk clutch facings.

The present invention is directed to overcome the aforementioned problems associated with mechanical presses, wherein it is desired to provide a drive disk with a circumferential adaptable attachment so that the drive disk may expand radially when heated, without affecting the axial location of the drive disk, thereby preventing closeout and premature burnout of frictional contact surfaces.

SUMMARY OF THE INVENTION

The present invention overcomes the problems and disadvantages of the above-described prior art mechanical presses by providing for radial movement of the drive disk thereby reducing or eliminating axial expansion and closeout.

Generally, the present invention provides a mechanical press with a two-part drive disk assembly. The drive disk proper, having a frictional coating material, is attached to an adapter plate along the circumference of the drive disk. The adapter plate is connected to the conventional clutch plate of the press. The driven disk clutch facings are permitted to engage the drive disk on opposite sides thereof. During operation, friction between the drive disk and driven disk causes the drive disk to expand in a radial direction as permitted by the circumferential attachment to the adapter plate.

More specifically, the present invention provides, in one form thereof, a drive disk adapter plate connected to the drive disk by a plurality of circumferentially spaced, stacked flexible straps attached tangentially to the drive disk. Each flexible strap is constructed from a relatively thin metal strip, flexible in one direction, but relatively inflexible in a perpendicular direction. The flexible straps permit radial expansion of the drive disk in the direction in which the straps flex. By permitting radial expansion, axial movement caused by thermal expansion in the radial direction of the drive disk is prevented or reduced.

An advantage of the drive disk adapter assembly of the present invention, in accordance with one form, is that the drive disk is now able to expand radially with no or little affect to the axial location of the drive disk. The connecting straps are aligned so that the direction in which the straps are inflexible is oriented so that the drive disk is stably mounted in the axial direction.

Another advantage of the drive disk adapter assembly is that the flexible attachment straps help dissipate heat from the drive disk reducing the chances of overheating, thereby resulting in a longer drive disk and/or friction material lifetime.

Yet another advantage of the drive disk adapter assembly is that the stacking of the straps increases strength of the radial connection, control of radial expansion, and adequate heat transfer. Additionally the stacking of the straps increases their strength in resisting axial movement of the drive disk.

A further advantage of the drive disk adapter assembly is that it permits quicker braking action of the press since the entire assembly is kept cooler. By reducing the chance of incidental contact between the drive disk and the driven disk, a lower risk of overheating and closeout results. Stopping time for the press is shorter since the drive disk and frictional braking surfaces are now relatively cool.

The invention, in one form thereof, provides a press having a frame structure with a crown bed in which a slide is guided by the frame structure for rectilinear reciprocating movement in opposed relationship to the bed. The drive mechanism, attached to the frame structure, includes a drive disk. The crankshaft is rotatably disposed within the crown and is in driving connection with the slide, with a driven disk connected to the crankshaft, for selective frictional connection to the drive disk. The press also includes a flexible connection connecting the drive disk to the drive mechanism, with the flexible connection allowing outward radial expansion of the drive disk during thermal expansion so that axial movement caused by radial thermal expansion is reduced.

In one aspect of the previously described form of the invention, the connection includes an adapter plate disposed between the drive disk and the drive mechanism with the drive disk centrally disposed within the adapter plate. The adapter plate may have a plurality of flanges to which a plurality of flexible straps (i.e. the flexible connection) attach. The adapter plate is further attached to the drive mechanism.

The invention, in another form thereof, includes a crankshaft rotatably disposed on the crown in driving connection with the slide. A driven disk is connected to the crankshaft. A drive disk assembly connected to the drive mechanism, includes an adapter plate attached to the drive mechanism and a drive disk connected to the adapter plate by a plurality of flexible straps. The flexible straps permit outward radial expansion of the drive disk during press operation thereby reducing axial closeout.

In accord with another aspect of the invention, the flexible straps attach tangentially to the drive disk and are flexible in a radial direction and relatively inflexible in circumferential and axial directions.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a sectional view of the drive disk, adapter plate and clutch taken along the line 3—3 of FIG. 4 viewed in the direction of the arrows.

FIG. 4 is a front view of the drive plate shown attached to the adapter plate.

FIG. 5 is a front view of the adapter plate.

FIG. 6 is a sectional view taken along the line 6—6 of FIG. 5 viewed in the direction of the arrows.

Figure 1:
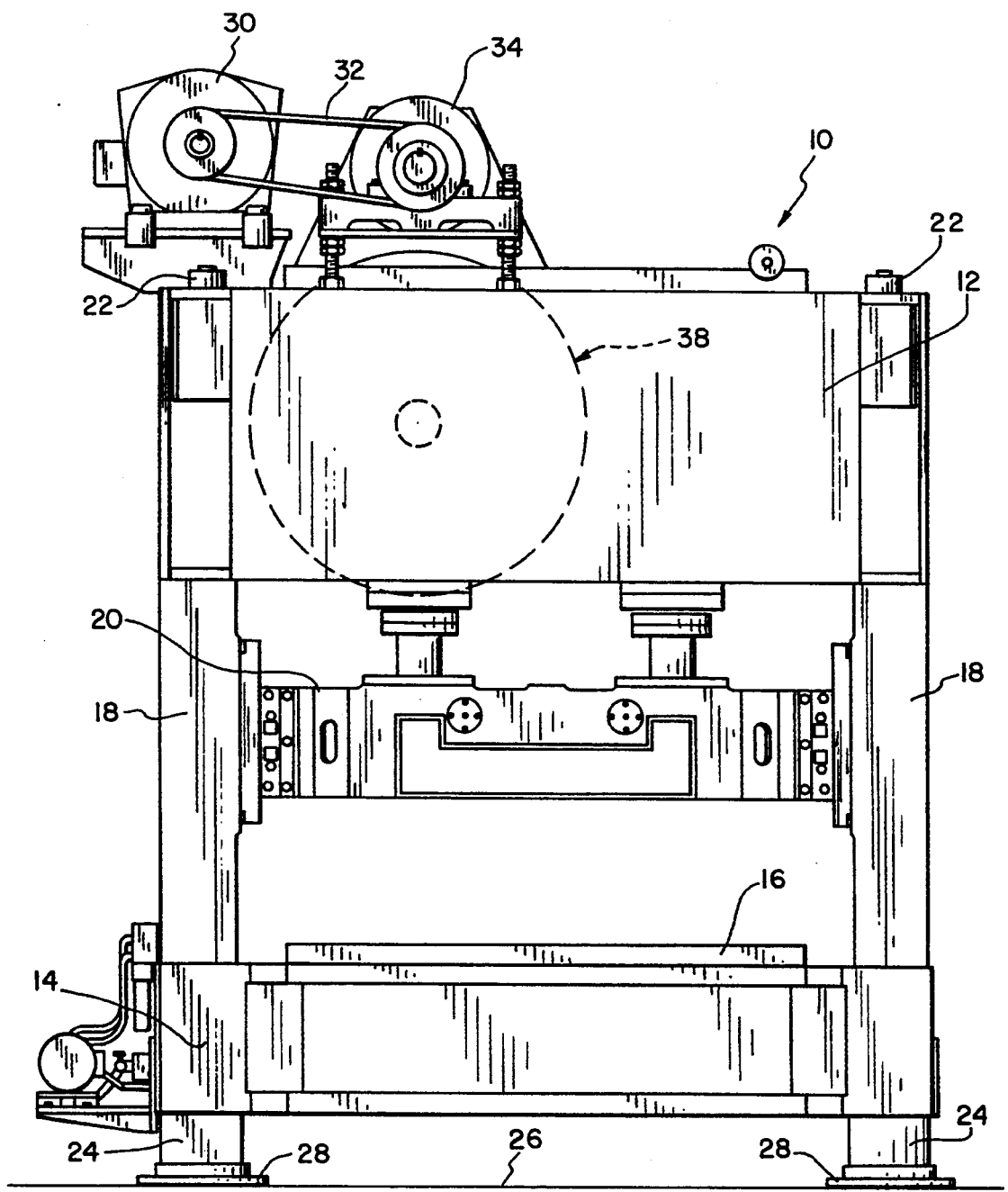
FIG. 1 is an elevational front view of a press incorporating the present invention in one form thereof.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring now to FIG. 1, mechanical press 10 comprises a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for reciprocating movement. Tie rods (not shown), extending through crown 12, uprights 18 and bed portion 14, are attached at each end with tie rod nuts 22. Leg members 24 are formed as an extension of bed 14 and are generally mounted on shop floor 26 by means of shock absorbing pads 28. A drive press motor 30, part of the drive mechanism, is attached by means of a belt 32 to an auxiliary flywheel 34 attached to crown 12. Auxiliary flywheel 34 is connected by means of a belt (not shown) to the main flywheel 36 of the clutch/brake assembly 38.

Figure 2:
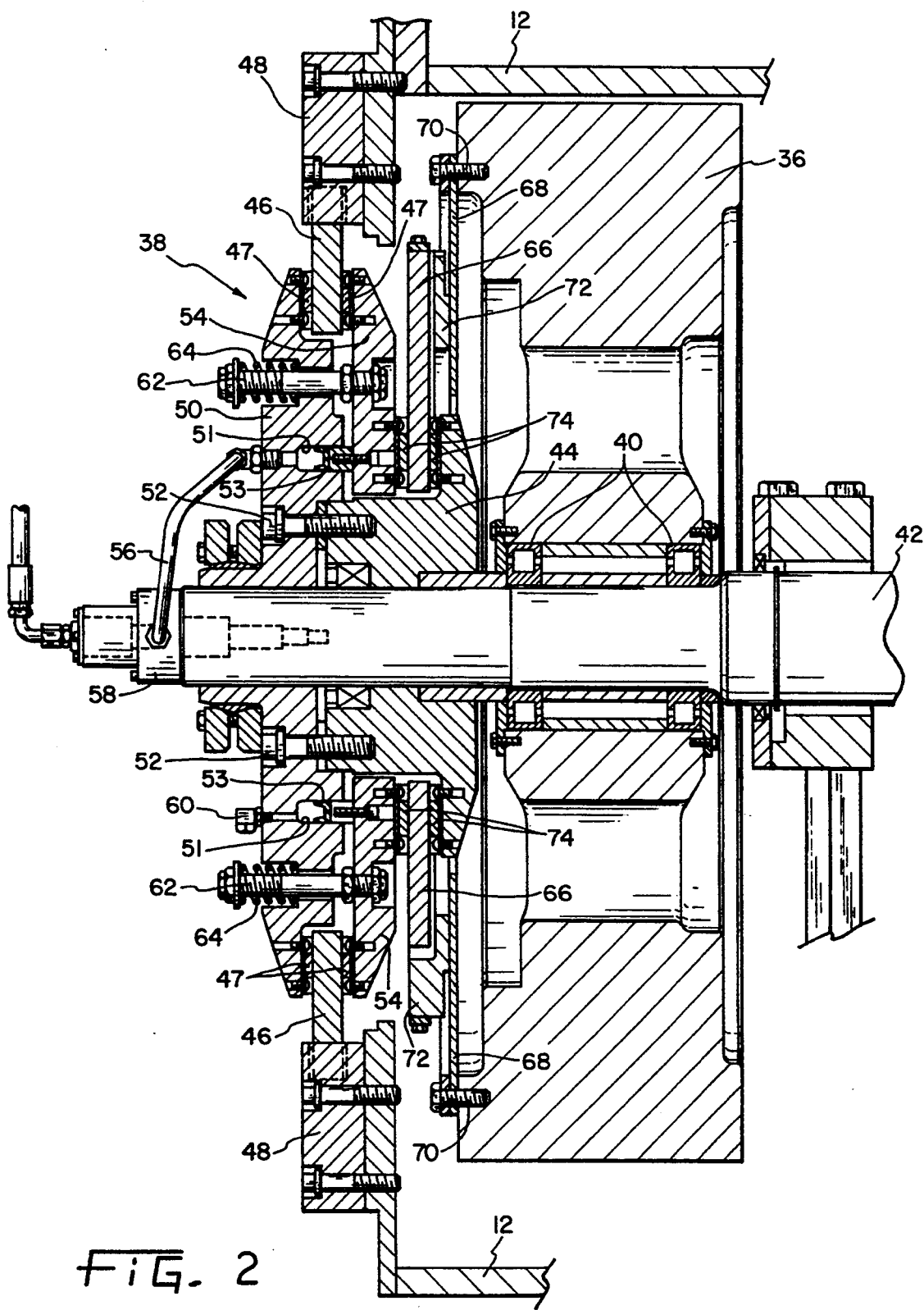
FIG. 2 is an enlarged sectional view of the brake and clutch assembly connected to the press crankshaft.

FIG. 2 shows a clutch/brake assembly 38 of the press having flywheel 36 disposed, by means of bearings 40, about crankshaft 42. Clutch sleeve 44, containing both the brake system and clutch system of mechanical press 10, is attached to crankshaft 42. Brake disk 46 is held by brake disk key 48 in a stationary manner on crown 12 of press 10.

Piston housing 50 is connected by bolts 52 to clutch sleeve 44. In terms of the clutch function of assembly 38, piston housing 50 permits combination piston/driven disk 54 to be actuated into contact with drive disk 66 by means of hydraulic pressure. Hydraulic pressure is supplied to driven disk 54 by means of hydraulic line 56 connected to rotary union 58 at the end of crankshaft 42. More specifically, piston housing 50 contains a cylinder 51 connected to the hydraulic pressure means of the press via hydraulic line 56. The cylinder 51 contains a movable piston 53 attached to driven disk 54. When hydraulic pressure is applied through line 56, the piston 53 is pushed through cylinder 51, thereby causing driven disk 54 to move axially toward and contact drive disk 66. This contact permits transfer of torque from drive disk 66 to driven disk 54 and clutch sleeve 44. At least one bleeder valve 60 is included to permit bleeding of entrapped air within the hydraulic system.

As shown in FIG. 2, driven disk 54 is also connected to piston housing 50 by means of a brake spring stud 62 biased by coil spring 64. Coil spring 64 axially biases the driven disk 54 into a position to contact brake disk 46 thereby accomplishing the braking function for assembly 38 when hydraulic pressure within cylinder 51 is reduced. FIG. 2 shows portions of brake facing 47 on both piston housing 50 and driven disk 54 in opposed relationship, to contact opposite sides of brake disk 46.

The present invention, in one form thereof, comprises the connection between the drive means, such as main flywheel 36 and drive disk 66. Flywheel 36 is connected to a flex clutch plate 68 by a plurality of bolts 70. Flex clutch plate 68 is known in the art to comprise a plurality of thin, spaced, metal segments that, in use, are gradually and resiliently pressed into engagement with other clutch members. Flex clutch plate 68 is used to allow for the axial displacement of drive disk 66 necessary during clutch engagement. This resiliency is also used to reduce any sharp jolts to press 10 when driven disk 54 engages drive disk 66. To clutch plate 68 is attached an adapter plate 72 of the present invention, so that adapter plate 72 is the intermediate connection between drive disk 66 and flex clutch plate 68.

Adapter plate 72 may be attached to clutch plate 68 in many ways, but the preferred attachment method is with bolts (not shown) through a plurality of holes 73 in adapter plate 72 (see FIG. 5). Drive disk 66 is located between clutch facings 74 on both clutch sleeve 44 and driven disk 54 When hydraulic pressure is applied, clutch facings 74 interfere with drive disk 66 thereby connecting the rotational energy of flywheel 36 to crankshaft 42 via clutch sleeve 44 and driven disk 54/piston housing 50.

This interference between clutch facings 74 and drive disk 66 causes frictional heating and therefore expansion of drive disk 66 to occur. This expansion, if not controlled, could lead to incidental contact between drive disk 66 and clutch facings 74 thereby creating additional friction and heat. To prevent this expansion from causing incidental contact, the expansion of drive disk 66 is permitted only in the radial direction, therefore no further incidental contact with the clutch facings 74 in the axial direction occurs. The present invention allows drive disk 66 to expand radially, with little or no affect to axial location of the drive disk 66.

Figure 7:
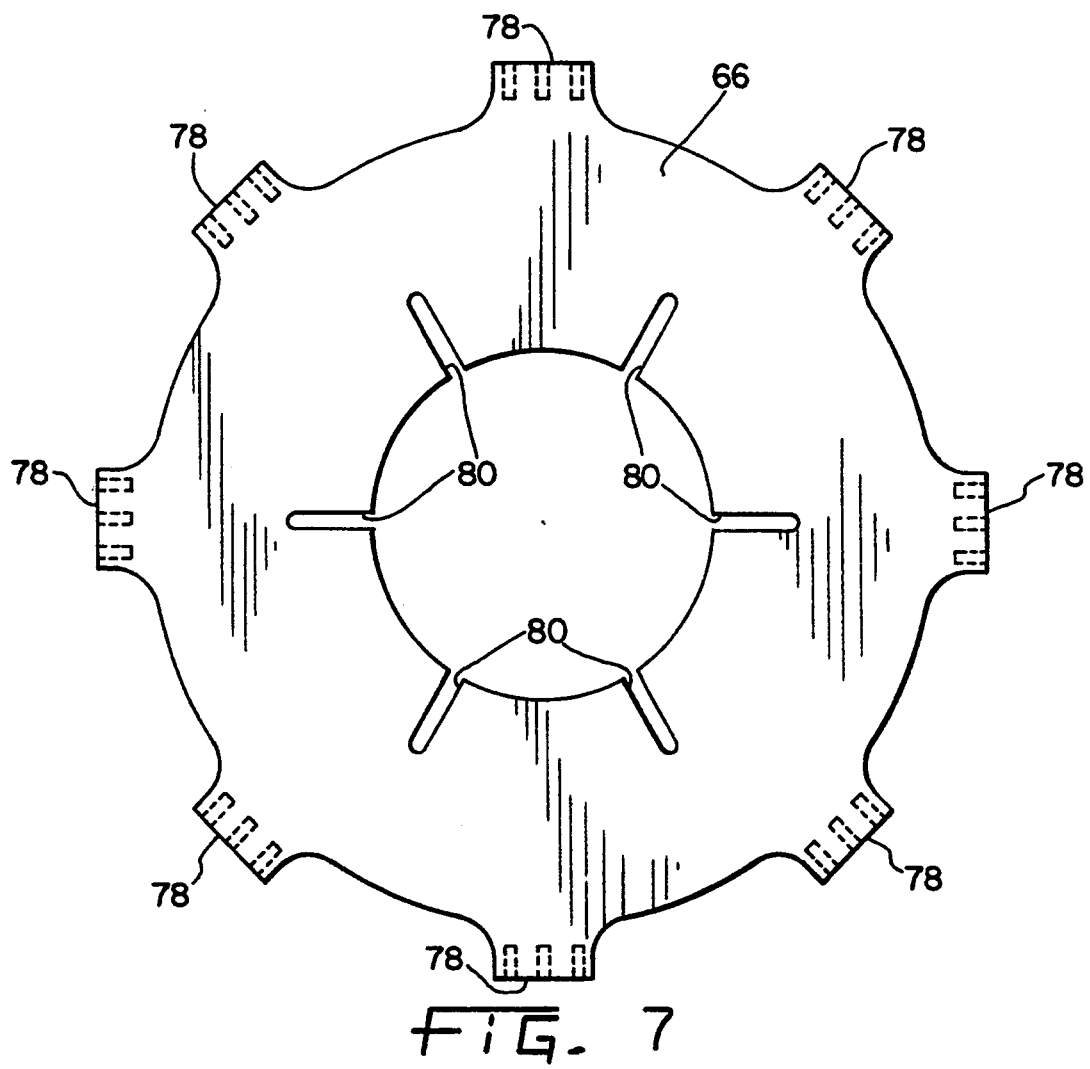
FIG. 7 is a enlarged front view of the drive disk.

One form of the present invention is shown in enlarged fashion in FIGS. 3 and 4. The adapter plate 72, preferably of, but not limited to octagonal form, is connected to drive disk 66 by a flexible connection means such as a plurality of straps 76. Straps 76 have two ends 77 bolted to the adapter plate 72 through bolt holes 79. Straps 76 are also centrally bolted, through holes 81, to radially extending arms 78 on drive disk 66. Drive disk 66 includes slots 80 for cooling and thermal expansion (FIG. 7).

Figure 8:
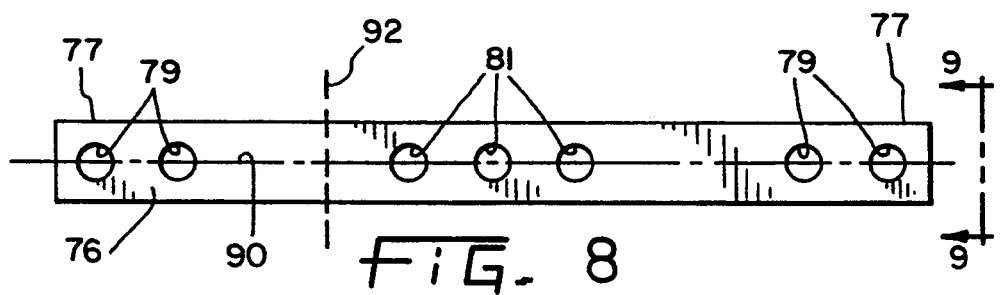
FIG. 8 is a top view of one of the flexible attachment straps.

As shown in FIG. 5, adapter plate 72 includes axial flanges 82 along a circumferential edge, which permit anchoring of connection bolts 84. Alternatively, instead of an octagonal form, adapter plate 72 may take on other polygonal or circular shapes. Drive disk 66, in the preferred embodiment, includes eight (8) radially extending arms 78 that are the connection points for flexible straps 76. FIG. 8 is a plan view of a single flexible strap attachment 76.

Figure 9:
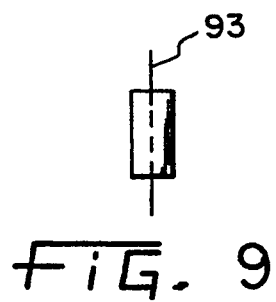
FIG. 9 is an end view (not to scale) taken along the line 9—9 of FIG. 8, viewed in the direction of the arrows, of one of the flexible attachment straps.

Flexible straps 76 are made from thin pieces of stainless or spring steel, although other materials may be used. Each strap 76 is approximately 1/16 to ⅛ inch in thickness. Straps 76 are constructed so that they are relatively flexible in one direction, generally their long axis 90, while relatively inflexible in their short axes 92 and 93, which is perpendicular to long axis 90 (FIG. 8 and FIG. 9). The attachment between drive disk 66 and adapter plate 72 takes place along the long axis 90 of strap 76. The relative inflexibility of strap 76 along short axes 92 and 93, increases the stability between drive disk 66 and adapter plate 72 in the axial direction of the press drive, further preventing relative axial movement or expansion of drive disk 66.

In the preferred embodiment, normally there are five (5) to ten (10) flexible straps 76 stacked one upon another to connect adapter plate 72 to drive disk 66. Drive disk 66 is located radially inwardly of adapter plate 72, but in an alternate form, may be located radially outward of plate 72. By connecting drive disk 66 and adapter plate 72 in a radial orientation, axial movement caused by radial expansion of drive disk 66 is reduced and/or prevented since drive disk 66 may now expand radially through the means of the tangentially attached straps 76.

In operation, press drive motor 30 will spin auxiliary flywheel 34 and main flywheel 36 to speed. Upon a command, hydraulic fluid is applied under pressure to rotary union 58 thereby traveling down through hydraulic line 56 and causing piston 53 to move in cylinder 51. This causes driven disk 54 and its associated clutch facings 74 to move into contact with drive disk 66. Flywheel 36, spinning both adapter plate 72 and drive plate 66, will transfer rotational energy to the clutch facings 74 and therefore to driven disk 54 and clutch sleeve 44. This will cause driven disk 54, clutch sleeve 44 and crankshaft 42 to rotate, thereby causing connecting rods (not shown) to reciprocate slide 20 in rectilinear movement. Any movement caused by thermal expansion of drive disk 66 during use will be compensated for in a radial direction because of the flexibility created by flexible straps 76.

Upon completion of the press forming operation, hydraulic fluid pressure is released from rotary union 58 thereby causing brake spring 64 to axially move driven disk 54 away from drive disk 66 and cause brake facings 47 to move into contact with brake disk 46. This action will stop crankshaft 42 from rotating.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press comprising:
   a frame structure with a crown and a bed;
   a slide guided by the frame structure for rectilinear reciprocating movement in opposed relation to said bed;
   a drive mechanism attached to said frame structure, said drive mechanism including a drive disk;
   a crankshaft rotatably disposed within said crown and in driving connection with said slide;
   a driven disk connected to said crankshaft for selective frictional connection with said drive disk; and
   a flexible connection connecting said drive disk to said drive mechanism, said flexible connection allowing outward radial expansion of said drive disk during thermal expansion of said drive disk, whereby axial movement of said drive disk is reduced.

2. The press of claim 1 in which said flexible connection comprises a plurality of flexible straps.

3. The press of claim 2 in which said flexible straps are constructed from spring steel.

4. The press of claim 2 in which said flexible straps are constructed from stainless steel.

5. The press of claim 2 wherein said connection includes an adapter plate attached to said drive disk by said flexible straps, said drive disk centrally radially disposed within said adapter plate.

6. The press of claim 2 in which said connection includes an adapter plate having a plurality of flanges to which said flexible straps attach, said adapter plate attached to said drive mechanism.

7. The press of claim 1 wherein said connection includes an adapter plate disposed between said drive disk and said drive mechanism, said drive disk centrally disposed within said adapter plate.

8. The press of claim 1 in which said connection includes an adapter plate having a plurality of flanges to which said drive disk is attached.

9. A press comprising:
   a frame structure with a crown and a bed;
   a slide guided by the frame structure for rectilinear reciprocating movement in opposed relation to said bed;
   a drive mechanism attached to said frame structure;

a crankshaft rotatably disposed within said crown and in driving connection with said slide;

a driven disk connected to said crankshaft;

a drive disk connected to said drive mechanism by a plurality of flexible straps, said drive disk selectively engaged by said driven disk, whereby said flexible straps permit radial expansion of said drive disk during press operation to reduce axial movement caused by thermal expansion of said drive disk.

10. The press of claim 9 in which said drive disk is located radially inwardly of said drive mechanism, said straps attaching tangentially to said drive disk.

11. The press of claim 10 in which said drive mechanism includes an adapter plate having a plurality of flanges to which said flexible straps attach.

12. The press of claim 11 in which said flexible straps are constructed from stainless steel.

13. The press of claim 11 in which said flexible straps are constructed from spring steel.

14. The press of claim 11 in which said flexible straps are flexible in a radial direction and relatively inflexible in circumferential and axial directions.

15. The press of claim 9 in which said drive mechanism includes an adapter plate to which said flexible straps attach along a radial edge.

16. The press of claim 15 in which said flexible straps are constructed from stainless steel.

17. The press of claim 15 in which said flexible straps are constructed from spring steel.

18. A press comprising:

a frame structure with a crown and a bed;

a slide guided by the frame structure for rectilinear reciprocating movement in opposed relation to said bed;

a drive mechanism attached to said frame structure;

a crankshaft rotatably disposed within said crown and in driving connection with said slide, a driven disk connected to said crankshaft; and a drive disk assembly connected to said drive mechanism, said drive disk assembly including:

an adapter plate attached to said drive mechanism; and a drive disk which said driven disk selectively engages, said drive disk connected to said adapter plate by a plurality of flexible straps, whereby said flexible straps permit outward radial expansion of said drive disk during press operation thereby preventing axial closeout.

19. The press of claim 18 in which said flexible straps are constructed from stainless steel.

20. The press of claim 18 in which said flexible straps are constructed from spring steel.

21. The press of claim 18 in which said adapter plate includes a plurality of axially extending flanges, said flexible straps attach along a circumferential edge of said drive disk and to said adapter plate flanges.

* * * * *